United States Patent [19]

Kalokhe

[11] Patent Number: 4,464,085
[45] Date of Patent: Aug. 7, 1984

[54] PIN LOCK CUTTING TOOL
[75] Inventor: Shivdas A. Kalokhe, Clinton, Canada
[73] Assignee: Ex-Cell-O Corporation, Troy, Mich.
[21] Appl. No.: 434,153
[22] Filed: Oct. 13, 1982
[51] Int. Cl.³ ............................................... B26D 1/00
[52] U.S. Cl. ................................................... 407/105
[58] Field of Search ................................. 407/104, 105
[56] References Cited

U.S. PATENT DOCUMENTS 3,623,201 11/1971 Gustafson ........................... 407/104

FOREIGN PATENT DOCUMENTS 2402971 1/1974 Fed. Rep. of Germany ...... 407/105
2041797 9/1980 United Kingdom ................ 407/105

Primary Examiner—Leonidas Vlachos
Attorney, Agent, or Firm—Edward J. Timmer

[57] ABSTRACT

The cutting tool includes a cutting insert retention pin with an intermediate radial flange adapted to engage a crescent-shaped bottom wall or shoulder in a specially-configured pin-receiving cavity in the toolholder insert pocket and thereby cause the retention pin to tilt in an insert locking direction in the cavity. The pin-receiving cavity is formed by first and second intersecting circular counterbores and a tapped hole with the first counterbore and tapped hole being coaxial and the second counterbore being offset toward an abutment surface in the toolholder pocket and deeper than the first counterbore.

2 Claims, 6 Drawing Figures

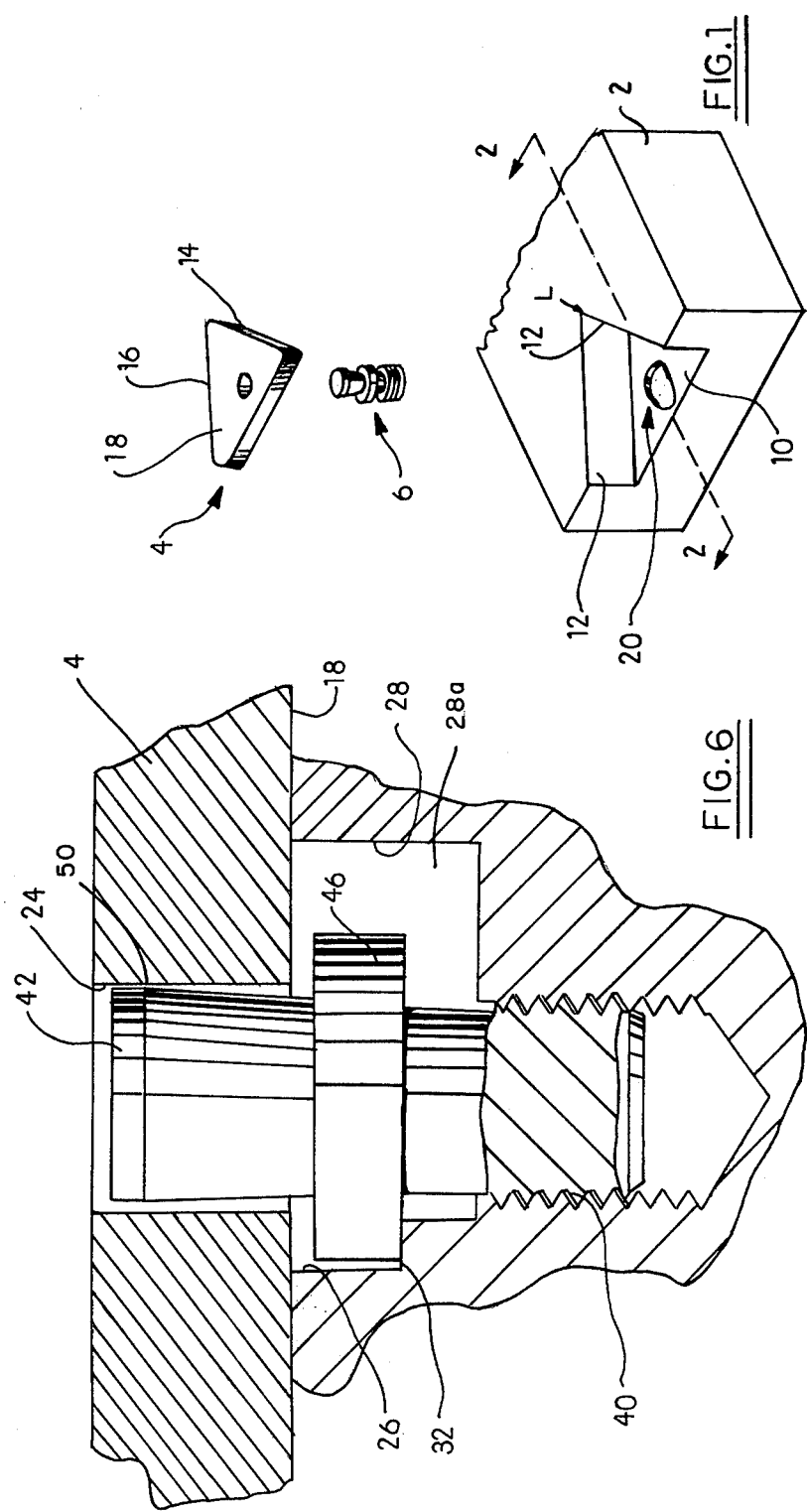

PIN LOCK CUTTING TOOL

FIELD OF THE INVENTION

The present invention relates to a cutting tool of the type used in machining metal and more specifically to a cutting tool having an indexable, replaceable cutting insert held in a toolholder.

BACKGROUND OF THE INVENTION

Cutting tools having pin-type holding means for retaining indexable, replaceable inserts in a toolholder are commonly used. In such cutting tools, a pin typically projects into a central hole in the cutting insert and holds the insert against a shoulder of the toolholder. Various pin and toolholder configurations and mechanisms have been developed to achieve holding of the cutting insert against the toolholder shoulder.

The Kelm U.S. Pat. Nos. 3,341,920, 3,341,921 and 3,341,923 issued Sept. 19, 1967 disclose a pin with a conical seat portion adapted to engage a conical recess in the toolholder to cause the pin to move toward a shoulder thereon when the pin is screwed into a tapped hole in the toolholder. Pin movement toward the shoulder is effected by offsetting the conical recess relative to the tapped hole and effects clamping of the cutting insert against the shoulder. An annular shoulder is provided on the insert retention pin for the purpose of retaining an insert seat on the toolholder when the cutting insert is being replaced. The Diemond et al. U.S. Pat. No. 3,310,859 issued Mar. 28, 1962 describes a somewhat similar retention pin/toolholder arrangement.

The Gustafson U.S. Pat. No. 3,623,201 issued Nov. 30, 1971 describes a cutting tool in which the retention pin is provided with an annular, radially-oriented shoulder which engages against an annular shim around their entire peripheries when the pin is threaded into a tapped hole in the toolholder to clamp a cutting insert against a shoulder on the toolholder. The axis of the tapped hole into which the retention pin is threaded is inclined relative to the insert seat on the toolholder so that the radial shoulder of the retention pin engages the shim, which is parallel to insert seat surface, at an angle and bends the retention pin toward the shoulder of the toolholder as it is threaded into the tapped hole, the pin shoulder eventually seating on the shim around their entire peripheries.

The Kaiser U.S. Pat. No. 3,296,683 issued Jan. 10, 1967 provides a cutting tool having a threaded clamping bolt received in a tapped hole oriented at an angle in the toolholder and an annular clamping washer beneath the bolt head for engaging on one side a crescent-shaped surface formed in the toolholder as the bolt is screwed into the tapped hole and for engaging on the other side a cutting blade to clamp it against the toolholder. The crescent-shaped surface is at an inclination to the plane of the toolholder so that the high point or central portion of the surface forms a fulcrum for the washer whereby the vertical side of the cutting blade is engaged against the vertical side of the toolholder.

Other examples of cutting tools of the general type described are illustrated as well as similar types in the following patents:

| U.S. Pat. No. | Issued |
| --- | --- |
| 1,838,520 | Dec. 29, 1931 |
| 2,598,581 | May 27, 1952 |
| 3,097,417 | July 16, 1963 |
| 3,173,191 | Mar. 16, 1965 |
| 3,187,406 | June 8, 1965 |
| 3,268,978 | Aug. 30, 1966 |
| 3,284,874 | Nov. 15, 1966 |
| 3,299,489 | Jan. 24, 1967 |
| 3,310,859 | Mar. 28, 1967 |
| 3,320,654 | May 23, 1967 |
| 3,341,919 | Sep. 19, 1967 |
| 3,368,265 | Feb. 13, 1968 |
| 3,408,722 | Nov. 5, 1968 |
| 3,416,209 | Dec. 17, 1968 |
| 3,488,822 | Jan. 13, 1970 |
| 3,491,421 | Jan. 27, 1970 |
| 3,540,102 | Nov. 17, 1970 |
| 3,654,682 | Apr. 11, 1972 |
| 3,662,444 | May 16, 1972 |
| 3,672,016 | June 27, 1972 |
| 3,815,195 | June 11, 1974 |
| 3,946,473 | Mar. 30, 1976 |
| 3,997,951 | Dec. 21, 1976 |
| 4,189,264 | Feb. 19, 1980 |
| 4,200,416 | Apr. 29, 1980 |
| 4,220,428 | Sept. 2, 1980 |
| 4,244,666 | Jan. 13, 1982 |
| 4,245,937 | Jan. 20, 1981 |

SUMMARY OF THE INVENTION

The present invention provides a cutting tool of the general working embodiment, the retention pin includes a clamping portion at one end to be received in a central hole in the cutting insert, a threaded portion at the other end and a radial flange intermediate the ends, and in which the toolholder includes an insert seating surface on which the cutting insert or insert support rests, an abutment surface against which the cutting insert is clamped by the pin and a pin-receiving cavity substantially perpendicular to the insert seating surface configured specially to cause the retention pin to tilt toward the abutment surface as its threaded end portion is threaded into the tapped hole of the toolholder and thereby cause the pin to clamp the cutting insert against the abutment surface for insert securement. The pin-receiving cavity is specially configured by counterboring first and second intersecting circular bores adjacent the insert seating surface of the toolholder with the first bore coaxial with the axis of the insert hole and retention pin and the second bore offset therefrom toward the abutment surface and deeper in depth and by forming a tapped hole beneath the bores coaxial with the first bore. The intersection of the first circular bore with the second circular bore forms a crescent-shaped recess extending laterally from the side of the second bore remote from the abutment surface and of lesser depth. The recess has a crescent-shaped shoulder defining the bottom thereof parallel with the insert seating surface for engaging the radial flange of the retention pin as it is threaded into the tapped hole and tilting the pin, especially the clamping end portion thereof, toward the abutment to clamp the insert thereagainst. The portion of the deeper second bore adjacent the abutment surface forms a clearance space to permit tilting of the retention pin without obstruction.

As a result of the particular construction of the cutting tool of the invention, in particular, the use of circular or cylindrical intersecting counterbores and pin features, a less expensive and lower cost alternative to existing tools of this general type is provided.

BRIEF DESCRIPTION OF THE DRAWINGS

FIG. 1 is a perspective view of a cutting tool of the invention using a triangular-shaped cutting insert.

FIG. 6 is similar to FIG. 2 with the addition of the retention pin in partial section.

DESCRIPTION OF PREFERRED EMBODIMENTS

Figure 3:
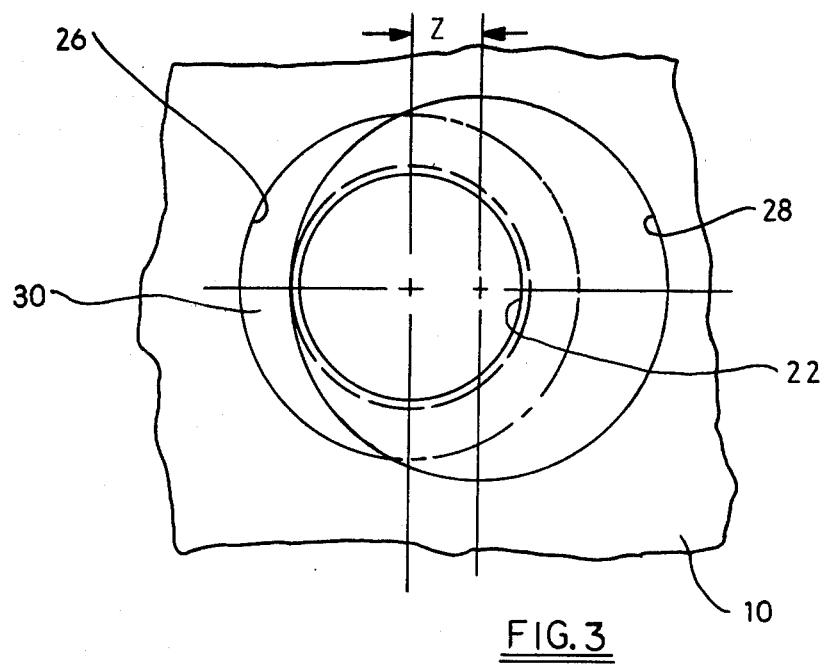
FIG. 3 is a top elevation view of the insert seating surface and pin-receiving cavity.

Referring to FIG. 1, a cutting tool of preferred construction is shown as comprising a toolholder 2, a cutting insert 4 of the carbide or other type and a retention pin 6. Of course, the toolholder includes at the end opposite from the cutting insert pocket 8 which receives the insert and retention pin, a shank (not shown) adapted for attachment to a tool post of a conventional metal cutting machine such as a lathe.

The insert pocket 8 comprises an insert seating surface 10 and a pair of intersecting abutment surfaces 12 against which the edges 14, 16 of the insert are clamped. Of course, the major insert surfaces 18 are adapted to be supported on the major insert seating surface 10 of the insert pocket directly or indirectly by an insert support (not shown) interposed between the insert 4 and seating surface 10 as is well known.

A pin-receiving cavity 20 with its axis perpendicular to the insert seating surface 10 is provided in the toolholder pocket 8. The cavity 20 is shown in more detail in FIGS. 2 and 3 as comprising a tapped hole 22 whose axis is aligned coaxially with the through-hole 24 in the cutting insert 4 which receives the retention pin 6 as will be described hereinbelow. The hole 24 of the cutting insert is perpendicular to the insert seating surface 10.

Above the tapped hole 22 are bored a first circular counterbore 26 and a second circular counterbore 28. The first counterbore 26 is bored coaxially with the tapped hole 22 to a depth $D_1$, whereas the second counterbore 28 is bored with the axis offset by distance Z from the axes of the first counterbore 26 and tapped hole 22 in the direction of the abutment surfaces 12, in particular, toward the inboard line of intersection of those surfaces indicated at L. The depth of the second counterbore 28 is greater than that of the first counterbore as indicated by $D_2$.

Figure 2:
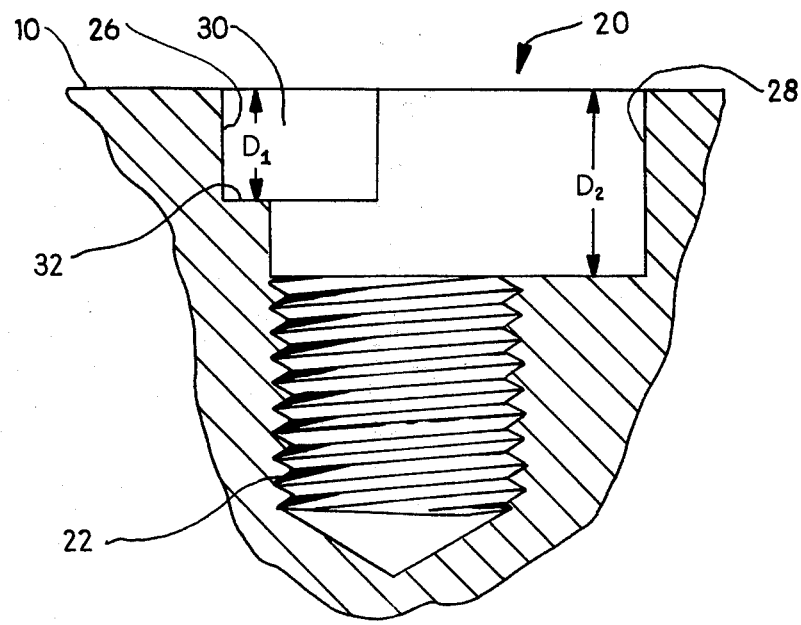
FIG. 2 is a cross-sectional view through the pin-reviewing cavity of the toolholder along line 2—2 of FIG. 1.

Together, first and second counterbores 26 and 28 define a cavity adjacent the insert seating surface 10 which cavity includes a cylindrical counterbore corresponding to second counterbore 28 with a crescent-shaped recess 30 extending laterally from the side of the cylindrical bore in a direction opposite to the offset thereof. That is, the crescent-shaped recess 30 extends outboard and laterally from the cylindrical counterbore away from the abutment surface intersection L, as shown in FIGS. 2 and 3. The crescent-shaped recess 30 includes a circular arc side wall formed by the first counterbore 26 and a crescent-shaped bottom wall 32 bounded by intersecting circular arcs as a result of the difference in the depths of counterbores 26 and 30. The crescent-shaped bottom wall 32 is parallel with the insert seating surface 10 as shown best in FIG. 2. As will be explained more fully below, the portion of the second counterbore 28 adjacent the abutment surfaces 12 provides a clearance space to allow tilting of the retention pin 6 without obstruction during lock-in of the insert on the toolholder.

Figure 5:
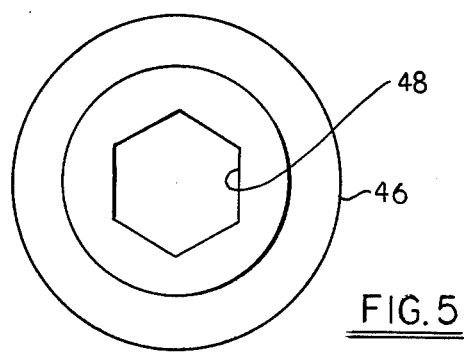
FIG. 5 is a top elevation of the retention pin.
Figure 4:
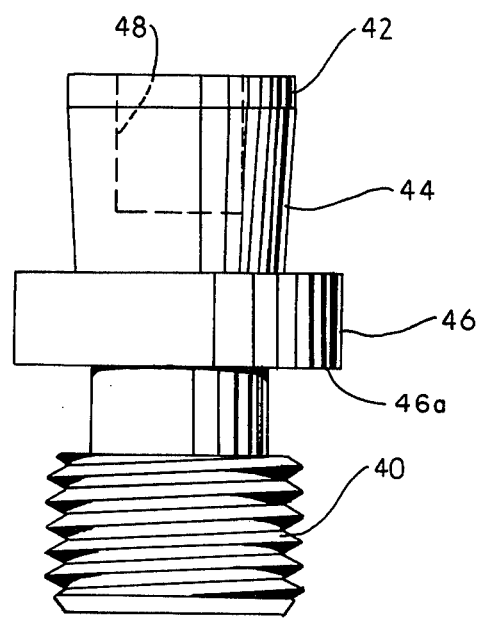
FIG. 4 is a side elevation of the retention pin.

The insert retention pin 6 adapted to be threaded into the pin-receiving cavity 20 is shown in more detail in FIGS. 4 and 5. The retention pin includes a threaded end portion 40 adapted to be threaded into the tapped hole 22 of the cavity 20. The threads of the tapped hole 22 are oversized relative to the threads on the retention pin 6 to allow the pin to tilt, as will be explained, during insert locking. The other end of the retention pin includes a cylindrical insert clamping portion 42 and a conical portion 44 extending therefrom to an intermediate radial flange 46 whose diameter is slightly less than that of first counterbore 26. A hexagonal recess 48 is provided in the end of the retention pin to enable rotation thereof for threading into the tapped hole 22 by means of an Allen wrench.

The cylindrical clamping portion 42 and conical portion 44 of the retention pin are adapted to be received in the central hole 24 of the cutting insert 4 when the insert is locked on the toolholder 2. Usually, the hole is at the geometric center of the cutting insert regardless of the latter's shape which may be other than triangular. FIG. 6 shows the cutting insert 4 secured on the toolholder 2 by the retention pin 6. It is apparent that as the retention pin 6 is threaded into the tapped hole 40 of the pin receiving cavity that the annular flange surface 46a facing or adjacent the threaded end portion 40 contacts the crescent-shaped bottom recess wall 32. This engagement will cause the retention pin to tilt toward the intersection of the abutment surfaces 12 in the insert pocket 8 and force clamping portion 42 of the pin against insert wall 50 forming insert hole 24 in the same direction. This engagement clamps the insert against the abutment surfaces 12. The side portion 28a of the counterbore 28 provides a clearance space for the portions of the flange 46 away from the recess 30 to tilt as required to achieve insert locking, as clearly shown in FIG. 6. Due to the extended distance of the area of contact between the flange surface 46a and bottom recess wall 32 from the axis of the retention pin, a large locking force can be applied to the insert 4 against abutment surfaces 12.

While certain preferred embodiments of the invention have been illustrated and described in detail, it will be understood that various changes and modifications may be made therein without departing from the spirit and scope of the invention.

I claim:

1. A cutting tool of the type using a cutting insert with an axial hole therethrough comprising (a) a toolholder having an insert seating surface means on which the cutting insert is supported and an abutment surface means inboard on the seating surface means and against which the cutting insert is held, said toolholder having a retention pin-receiving cavity on said seating surface means including a tapped hole having a longitudinal axis, a circular cross-section bore intersecting with said tapped hole and having a longitudinal axis offset from the axis of said tapped hole toward said abutment surface means and of lesser depth than said tapped hole, and another circular cross-section bore substantially coaxial with said tapped hole and of lesser depth than the offset bore and intersecting therewith such that a portion of said another bore forms a crescent-shaped recess extending outboard from the offset bore above said tapped hole in a direction away from said abutment surface means and having a crescent-shaped recess bottom and the remaining portion of said another bore is within the offset bore, and (b) a retention pin having a threaded portion at one end threadable into said tapped hole, an insert-engaging portion at the other end received in the axial insert hole and an intermediate annular flange between the ends engageable with said crescent-shaped recess bottom as the pin is threaded into the toolholder, causing the pin to tilt toward the abutment surface means with said insert-engaging portion of the pin forcing the cutting insert against said abutment surface means.

2. The cutting tool of claim 1 wherein the crescent-shaped recess bottom is substantially parallel to said insert sealing surface and the flange of said pin is generally parallel to said insert seating surface when said pin is threaded into said toolholder.

* * * * *

UNITED STATES PATENT AND TRADEMARK OFFICE
CERTIFICATE OF CORRECTION

PATENT NO. : 4,464,085
DATED : August 7, 1984
INVENTOR(S) : Shivdas A. Kalokhe

It is certified that error appears in the above-identified patent and that said Letters Patent are hereby corrected as shown below:

Column 2, line 31, after "general" insert --pin-lock type described in which, in a typical--

Signed and Sealed this

Twenty-second Day of January 1985

[SEAL]

Attest:

DONALD J. QUIGG

*Attesting Officer*   *Acting Commissioner of Patents and Trademarks*